(12) United States Patent
Darr

(10) Patent No.: US 7,650,292 B2
(45) Date of Patent: Jan. 19, 2010

(54) INSURANCE PRODUCTS AND RELATED METHODS AND SYSTEMS

(75) Inventor: James J. Darr, Greenwich, CT (US)

(73) Assignee: Greenwich Financial International, LLC, Greenwich, CT (US)

( * ) Notice: Subject to any disclaimer, the term of this patent is extended or adjusted under 35 U.S.C. 154(b) by 656 days.

(21) Appl. No.: 11/193,330

(22) Filed: Aug. 1, 2005

(65) Prior Publication Data

US 2007/0038481 A1 Feb. 15, 2007

(51) Int. Cl.
G06Q 40/00 (2006.01)
(52) U.S. Cl. .............................................. 705/4; 705/35
(58) Field of Classification Search ................... 705/4, 705/35
See application file for complete search history.

(56) References Cited

U.S. PATENT DOCUMENTS

| | | | |
|---|---|---|---|
| 5,752,236 A | 5/1998 | Sexton et al. | |
| 5,926,792 A * | 7/1999 | Koppes et al. | 705/4 |
| 5,956,691 A | 9/1999 | Powers | |
| 6,330,541 B1 | 12/2001 | Meyer et al. | |
| 6,456,979 B1 * | 9/2002 | Flagg | 705/4 |
| 6,584,446 B1 | 6/2003 | Buchanan et al. | |
| 6,950,805 B2 | 9/2005 | Kavanaugh | |
| 2002/0035489 A1 * | 3/2002 | Herman et al. | 705/4 |
| 2002/0087365 A1 | 7/2002 | Kavanaugh | |
| 2003/0074232 A1 * | 4/2003 | Lee | 705/4 |
| 2003/0074233 A1 | 4/2003 | Lee | |
| 2003/0083975 A1 | 5/2003 | O'Grady et al. | |
| 2003/0088430 A1 * | 5/2003 | Ruark | 705/1 |
| 2003/0105690 A1 | 6/2003 | Brown et al. | |
| 2003/0105713 A1 | 6/2003 | Greenwald et al. | |
| 2003/0110061 A1 | 6/2003 | Lakenbach et al. | |
| 2003/0144937 A1 | 7/2003 | Garella et al. | |
| 2004/0064391 A1 * | 4/2004 | Lange | 705/36 |
| 2004/0093297 A1 | 5/2004 | Strobel, II et al. | |

(Continued)

FOREIGN PATENT DOCUMENTS

EP 0 955 595 A1 11/1999

(Continued)

OTHER PUBLICATIONS

Hunt, James H., F.S.A. "Variable Universal Life Insurance: Is it Worth it?", Feb. 2003.

(Continued)

*Primary Examiner*—Hani Kazimi
(74) *Attorney, Agent, or Firm*—Patton Boggs LLP

(57) ABSTRACT

A method of structuring a life insurance product includes: selecting one or more insureds from a pool of applicants; collecting at least one premium payment, the at least one premium payment comprising a charge for cost of insurance; issuing at least one policy covering the one or more insureds, the at least one policy having a cash value and a death benefit; placing the at least one premium payment into an account, thereby populating the account with assets; investing the assets thereby generating a rate of return; tying the cash value and death benefit amounts to the rate of return; creating a mortality fluctuation reserve, adding the mortality fluctuation reserve to the account, and investing the reserve; and calculating a mortality experience credit upon satisfying certain criteria. Associated data processing methods and systems are also described.

51 Claims, 1 Drawing Sheet

U.S. PATENT DOCUMENTS

| | | | |
|---|---|---|---|
| 2004/0176989 | A1 | 9/2004 | Darr |
| 2004/0177021 | A1* | 9/2004 | Carlson et al. ................. 705/36 |
| 2004/0181436 | A1* | 9/2004 | Lange ............................ 705/4 |
| 2004/0199446 | A1* | 10/2004 | Lange ........................... 705/36 |
| 2004/0215493 | A1* | 10/2004 | Koppes et al. .................. 705/4 |
| 2004/0225537 | A1 | 11/2004 | Darr |
| 2004/0236612 | A1* | 11/2004 | Heusinkveld et al. ........... 705/4 |
| 2005/0060209 | A1* | 3/2005 | Hill et al. ....................... 705/4 |
| 2005/0071204 | A1* | 3/2005 | Parankirinathan .............. 705/4 |
| 2005/0216316 | A1 | 9/2005 | Brisbois et al. |
| 2007/0265889 | A1* | 11/2007 | Koppes et al. .................. 705/4 |
| 2007/0299760 | A1* | 12/2007 | Lange et al. ............... 705/36 R |

FOREIGN PATENT DOCUMENTS

| | | |
|---|---|---|
| EP | 1 222 596 B1 | 12/2003 |
| WO | WO 2005/089205 A2 | 9/2005 |
| WO | WO2007/016503 | 2/2007 |
| WO | WO 2009/076366 | 6/2009 |

OTHER PUBLICATIONS

Search Report for EP 05725328, dated Feb. 28, 2008.

Search Report for PCT/US05/08102 (WO 2005/089205), mailed Jan. 20, 2006.

XP002456252—Journal Officiel De L'Office Europeen Des Brevets. Official Journal of the European Patent Office.Amtsblattt Des Europaeischen Patentamts,—ISSN 0170-9291, pp. 592-593, published Nov. 1, 2007.

International Search Report for PCT/US08/86087, mailed Jan. 26, 2009.

In the U.S. Patent and Trademark Office, Non-Final Office Action in re: U.S. Appl. No. 10/382,947, dated May 11, 2009, 19 pages.

In the U.S. Patent and Trademark Office, Final Office Action in re: U.S. Appl. No. 10/382,947, dated oct. 31, 2009, 22 pages.

In the U.S. Patent and Trademark Office, Non-Final Office Action in re: U.S. Appl. No. 10/382,947, dated Apr. 17, 2008, 19 pages.

In the U.S. Patent and Trademark Office, Non-Final Office Action in re: U.S. Appl. No. 10/798,551, dated Jun. 9, 2009, 13 pages.

In the U.S. Patent and Trademark Office, Restriction Requirement in re: U.S. Appl. No. 10/798,551, dated Feb. 2, 2009, 8 pages.

In the U.S. Patent and Trademark Office, Non-Final Office Action in re: U.S. Appl. No. 10/798,551, dated Mar. 31, 2008, 8 pages.

* cited by examiner ized to maximize performance within methods and systems of the type described above. There is also a need for data processing methods and systems for accurately administering such products in a time-efficient and accurate manner.

INSURANCE PRODUCTS AND RELATED METHODS AND SYSTEMS

FIELD OF THE INVENTION

The presented invention is directed to insurance products, methods and related systems.

BACKGROUND OF THE INVENTION

In the following discussion certain articles and methods will be described for background and introductory purposes. Nothing contained herein is to be construed as an "admission" of prior art. Applicant expressly reserves the right to demonstrate, where appropriate, that the articles and methods referenced herein do not constitute prior art under the applicable statutory provisions.

There are many forms of life insurance available on the market. Once such form of insurance is often referred to as a "variable life insurance policy." This type of policy often has flexible premium and an adjustable death benefit. The cash values and death proceeds are usually linked to the investment results and expenses of the company that issued the policy.

While most purchase an insurance policy to preserve their family's financial security, these financial products have a number of other uses. One such use is within a charitable fundraising system or method. Commonly owned International Patent Application Serial No. PCT/US2005/08102, as well as commonly owned U.S. patent application Ser. Nos. 10/382,947 and 10/798,551 disclose such a systems or methods. The content of these two disclosures are incorporated herein by reference, in their entirety.

These methods generally involve a donor, or group of donors, who agree to be insured by and/or for the benefit of the organization, and who assign their rights in the policies to the charitable and/or nonprofit organization (NPO). The organization holds the policies in a passive vehicle. A lender provides capital to the organization in the form of a loan that is secured by the policies. The lender is repaid from the proceeds of the policies via the passive vehicle There is a need for insurance products and methods structured to provide advantages over current products and methods, and in particular, which are structured to maximize performance within methods and systems of the type described above. There is also a need for data processing methods and systems for accurately administering such products in a time-efficient and accurate manner.

SUMMARY OF THE INVENTION

It is, therefore, an object of this invention to provide insurance products, methods and/or systems that having beneficial features that make them optimal for use in certain situations, such as incorporation into a method for raising funds. According to certain alternative embodiments of the present invention, such methods for raising funds may optionally involve one or more donors who consent to be insured by, and/or for the benefit of, a charitable or NPO, and who grant whatever rights they may be deemed to have in the insurance product to the charitable or NPO. It is also an objective of the present invention to provide data processing methods and systems for accurately administering such products in a time-efficient manner.

According to one aspect of the present invention, there is provided a method of structuring a life insurance product, the method comprising: selecting one or more insureds from a pool of applicants; collecting at least one premium payment, the at least one premium payment comprising a charge for cost of insurance; issuing at least one policy covering the one or more insureds, the at least one policy having a cash value and a death benefit; placing the at least one premium payment into an account, thereby populating the account with assets; investing the assets thereby generating a rate of return; tying the cash value and death benefit amounts to the rate of return; creating and funding a mortality fluctuation reserve to stabilize the mortality experienced under the at least one policy, the reserve comprising the amount of funding less a net amount paid for death benefits, adding the mortality fluctuation reserve to the account, and investing the reserve; and periodically paying a mortality experience credit in the event that the actual mortality rate is more favorable than a predicted mortality rate, and to the extent that the mortality fluctuation reserve exceeds a maximum threshold value.

According to a further aspect, the present invention provides a data processing method for initiating, structuring and managing an insurance product, the method comprising: providing a data processing device comprising an input device, an output device, a processor and a memory; inputting information from a pool of insurance applicants into the data processing device via the input device; selecting one or more insureds from the pool of inputted applicants by comparison of the inputted information from each applicant stored in the memory using predetermined criteria; calculating the amount of at least one premium payment using, at least in part, cost of insurance information stored in the memory; generating at least one policy document utilizing, at least in part, the output device, the policy document comprising cash value and a death benefit information; associating the at least one premium payment with an account, the account being invested to generate a rate of return; inputting the rate of return into the memory, and calculating at least one cash value and death benefit value based, at least in part, on the rate of return; calculating a mortality fluctuation reserve to stabilize the mortality experienced under the at least one policy, the reserve comprising an amount of funding less a net amount paid for death benefits, and associating the reserve with the account; and periodically calculating a mortality experience credit in the event that the actual mortality rate is more favorable than a predicted mortality rate, and to the extent that the amount of the mortality fluctuation reserve exceeds a maximum threshold amount.

According to yet another aspect, the present invention provides a data processing system comprising a data processing device, the device comprising means for: inputting information from a pool of insurance applicants into the data processing device; selecting one or more insureds from the pool of inputted applicants by comparison of the inputted information from each applicants using predetermined criteria; calculating the amount of at least one premium payment using, at least in part, cost of insurance information; generating at least one policy document utilizing, at least in part, the output device, the policy document comprising cash value and death benefit information; associating the at least one premium payment with an account, the account being invested to generate a rate of return; inputting the rate of return, and calculating at least one cash value and death benefit value based, at least in part, on the rate of return; calculating a mortality fluctuation reserve to stabilize the mortality experienced under the at least one policy, the reserve comprising an amount of funding less a net amount paid for death benefits, and associating the reserve with the account; periodically calculating a mortality experience credit in the event that the actual mortality rate is more favorable than a predicted mortality rate, and to the extent that the equal to the amount of the mortality fluctuation reserve exceeds a maximum threshold amount.

BRIEF DESCRIPTION OF THE DRAWINGS

The preferred embodiments are illustrated in the drawings in which like reference numerals refer to the like elements and in which.

DETAILED DESCRIPTION OF THE INVENTION

Figure 1:
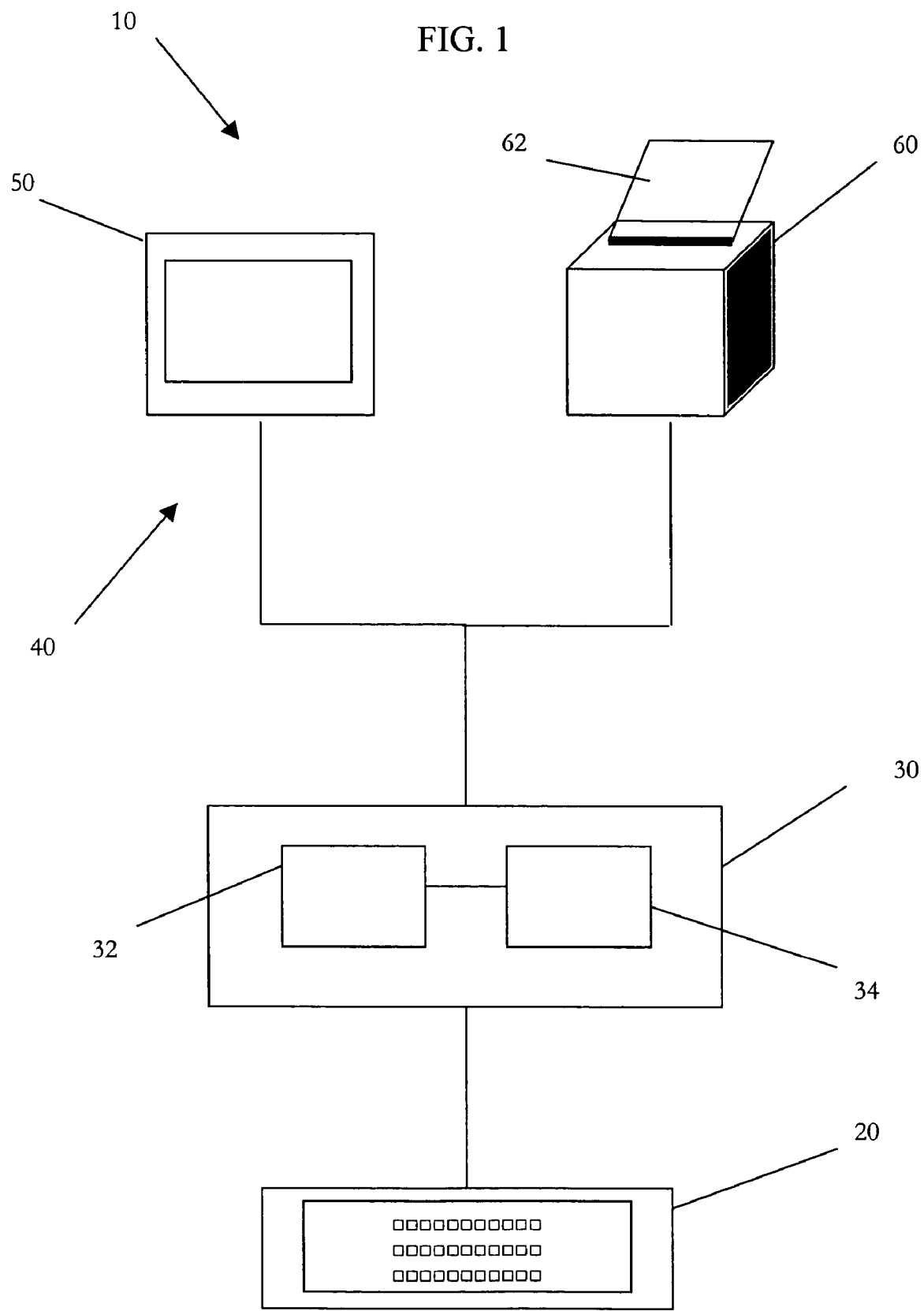
FIG. 1 is a schematic illustration of a system, method and data processing device according to the principles of the present invention.

An insurance product and its associated methods and systems are structured to comprise one or more of the following characteristics.

A prospective insured may provide consent to be insured and may meet minimum standards of good health, which can vary and are to be determined at the discretion of the insurer and/or administrator of the program. To be eligible for coverage, at policy issue an insured should optionally be at least age 21, and not older than 65.

According to one embodiment, a policy covering each individual is structured to have an initial death benefit of, for example, $250,000. The individual policies can be aggregated into pools. The number of policies in the pool(s) can vary. For example, one or more pools of approximately 1,000 lives or more can be formed. The policies can be structured to qualify as an insurance contract under U.S. tax law.

The policy can generally comprise a group flexible premium, adjustable death benefit, variable life insurance policy. Death benefits can be made payable upon the death of an insured prior to age 100. The insurance company may guarantee death benefits as long as the policy remains in force. Cash values can be made payable to the owner upon policy termination or upon the insured living to age 100. Premium payments can be flexible as to timing and amount, subject to minimum and maximum limitations, but it is expected that the policies can be funded by a single premium. All values and benefits of the policy can be based upon investment performance of a separate account(s), which are variable and are not guaranteed. According to one optional embodiment, the policy is structured as a Modified Endowment Contract (MEC). The MEC can be funded with a single premium, although the single premium can be paid with one or more payments.

Qualified non-profit organizations (NPO), including but not limited to educational, religious and charitable organizations can be responsible for premium payments, can designate itself as the beneficiary of policy benefits or name another beneficiary, have the right to direct the allocation of assets among the separate account(s), or appoint an entity or assignee to direct allocation of assets. There are no restrictions on the NPO to transfer rights of ownership to other parties.

According to certain embodiments of the present invention, the premium may comprise a single lump sum. The policy owner can make a single, one-time payment at issuance of the policy. Alternatively, the premium may be paid in multiple installments. The amount of the premium may be determined by any suitable methodology, such as utilizing actuarial tables like the 1980 Commissioner's Standard Ordinary Male and Female Tables or the Table 2 contained herein, each insured's age at their nearest birthday, and 4% interest.

According to the principles of the present invention, the charitable or non-profit organization, a supporting organization of the charitable or non-profit organization, an entity with insurable interest rights, or an agent thereof, can be responsible for payment of the premium. The supporting organization, entity with insurable interest rights, or agents thereof are not necessarily controlled by the charitable or non-profit organization. The supporting organization, entity with insurable interest rights, or agents thereof need not be based in the United States or its territories.

According to certain aspects of the present invention, an NPO can pay the premium by making an initial payment of, for example, $1,000 to initiate policy and coverage on a block of lives with remainder of the premium being paid by a separate installment(s) due within a set period of time, such as 5-10 business days. If premium is not paid, policy is retroactively canceled and the insurer is not liable for any payments. Once full payment is made, the policy is effective as of the date of the initial payment and any deaths that may have occurred after the payment date are payable by the insurer. When utilized within the United States, the policy is optionally a MEC pursuant to the requirements of Internal Revenue Code Section 7702 for U.S. Federal Income Tax purposes. Additional premiums will not be required if the policy cash value is sufficient to cover expenses and cost of insurance for the year. Depending upon the investment performance of the underlying separate account, future premiums may be required to be paid in order to keep the policy in full force.

As noted above, death benefits may increase or decrease with the underlying performance of the separate account. Death benefits may be increased to comply with the cash value accumulation test or corridor test under section 7702 of the United States Internal Revenue Code. Cash value accumulation test factors are based on the same mortality and interest assumptions used to determine the premium, and the insured's age at determination.

According to additional optional aspects of the present invention, assets supporting the liabilities of the life insurance policy can be invested in a separate account(s) of an insurance company (the "Company"). Assets of the separate account are the property of the Company but may not be chargeable with the liabilities arising out of any other business the Company may conduct. Policy values in the separate account are not guaranteed and will fluctuate commensurate with the value of assets in the separate account. Separate account investment performance may be provided on a monthly basis. Policy values may be updated on an annual basis. The Company will preferably offer several investment options within the separate account, each with its own investment objectives. The NPO may have the right to direct the allocation of assets among the available funds. Preferably, the policy will not prohibit the owner from assigning the right to direct allocation of assets to an entity or assignee, and will not restrict the owner from assigning to the investor the right to select the entity or assignee directing the allocation of assets. Moreover, the policy should not restrict the investor to which the original NPO transferred the right to select the third party directing the allocation of assets from subsequently assigning this right to another organization, institution or individual, or to restrict such organization, institution or individuals from successively assigning such rights. If such assignment occurs, proper notification should normally be given to the Company.

A fixed investment return option may also be available through the general account. The NPO or authorized investment manager may decide to invest some or all of the policies' assets in the general account of the insurance company. Interest on such assets will be credited to the policy cash values on an annual basis. Once each quarter the company will declare an interest-crediting rate based upon its expectations as to future investment performance. The interest crediting rate can be equal to the anticipated gross investment return rate less investment expenses and a margin for profit.

The company can make certain deductions from the separate account, premiums and from cash values. The policy owner may also incur other expenses associated with the purchase of the policy. A percentage of the assets allocated to the separate account may be deducted from the gross returns of the account on a monthly basis before being applied to the policy cash values. The monthly charge can be one-twelfth of the annual percentage (n/12) where one (n) is the annual percentage (See Table 1 below). The monthly charge can be applied to the asset value in a separate account on the valuation date, generally defined as the last business day of the month. If another valuation date is required during a month due to a distribution, transfer, or account activity requiring a valuation of assets, the asset charge can be applied on a pro-rata basis consistent with the above methodology.

A mortality risk charge can also be deducted at end of each year based upon a percentage of the cost of insurance charges. For example, the percentages may be 3% for years 1 through 10, 1% for years 11 through 20, and 0%, thereafter.

Optionally, there is no, or a minimal, up-front sales charge deducted before applying the premium to the policy cash values.

A one time set-up charge can be deducted from each insured's cash value at the time coverage becomes effective and for inclusion of each additional insured added in the future. The fee can vary by the number of units (each unit represents 1,000 lives) purchased, as shown in the following table.

TABLE I

Schedule of Fees and Charges

| | Number of Notes | |
|---|---|---|
| | 1 | 2+ |
| | Number of Lives | |
| | 1,000 | 2,000+ |
| ASSET EXPENSE CHARGE | | |
| TOTAL Initial Issue Charge | 50 BASIS PTS | 50 BASIS PTS |
| TOTAL Administrative Fee (1$^{st}$ 20 years) | $100 EACH LIFE $25 | $45 EACH LIFE >1000 $25 |

An administrative fee can be deducted from each insured's cash value at the beginning of each policy year. The fee may optionally be applied for the first 20 policy years, and can be zero thereafter.

According to certain embodiments of the present invention, charges for the cost of insurance may be determined and deducted from cash value annually for each insured. Alternatively, this can be done quarterly, monthly, or at some other predetermined period of time. The charge may be determined by applying the cost of insurance rates to the difference between the death benefit and the cash value at the beginning of each year, or other predetermined period of time. The cost of insurance will be periodically deducted from the account values on the assumption that death benefits are paid out at the end of the year or other predetermined period of time. For instance, if death benefits are paid monthly or quarterly, then the cost of insurance will be calculated and deducted on a monthly or quarterly basis. Cost of insurance charges in excess of amounts needed by the company to pay death benefits, due to fewer deaths than anticipated, can be credited to a mortality fluctuation reserve which will remain invested in the underlying separate accounts. A mortality experience credit will be paid when the reserve exceeds a predetermined threshold amount, such as two (2) times the cost of insurance, for a policy year. According to one embodiment of the present invention, cost of insurance rates should not exceed those illustrated in the following Table 2.

TABLE 2

Cost of Insurance Rates

| Age | Male | Female |
|---|---|---|
| 20 | 0.00190 | 0.00105 |
| 21 | 0.00191 | 0.00107 |
| 22 | 0.00189 | 0.00109 |
| 23 | 0.00186 | 0.00111 |
| 24 | 0.00182 | 0.00114 |
| 25 | 0.00177 | 0.00116 |
| 26 | 0.00173 | 0.00119 |
| 27 | 0.00171 | 0.00122 |
| 28 | 0.00170 | 0.00126 |
| 29 | 0.00171 | 0.00130 |
| 30 | 0.00173 | 0.00135 |
| 31 | 0.00178 | 0.00140 |
| 32 | 0.00183 | 0.00145 |
| 33 | 0.00191 | 0.00150 |
| 34 | 0.00200 | 0.00158 |
| 35 | 0.00211 | 0.00165 |
| 36 | 0.00224 | 0.00176 |
| 37 | 0.00240 | 0.00189 |
| 38 | 0.00258 | 0.00204 |
| 39 | 0.00279 | 0.00222 |
| 40 | 0.00302 | 0.00242 |
| 41 | 0.00329 | 0.00264 |
| 42 | 0.00356 | 0.00287 |
| 43 | 0.00387 | 0.00309 |
| 44 | 0.00419 | 0.00332 |
| 45 | 0.00455 | 0.00356 |
| 46 | 0.00492 | 0.00380 |
| 47 | 0.00532 | 0.00405 |
| 48 | 0.00574 | 0.00433 |
| 49 | 0.00621 | 0.00463 |
| 50 | 0.00671 | 0.00496 |
| 51 | 0.00730 | 0.00531 |
| 52 | 0.00796 | 0.00570 |
| 53 | 0.00871 | 0.00615 |
| 54 | 0.00956 | 0.00661 |
| 55 | 0.01047 | 0.00709 |
| 56 | 0.01146 | 0.00757 |
| 57 | 0.01249 | 0.00803 |
| 58 | 0.01359 | 0.00847 |
| 59 | 0.01477 | 0.00894 |
| 60 | 0.01608 | 0.00947 |
| 61 | 0.01754 | 0.01013 |
| 62 | 0.01919 | 0.01096 |
| 63 | 0.02106 | 0.01202 |
| 64 | 0.02314 | 0.01325 |
| 65 | 0.02542 | 0.01459 |
| 66 | 0.02785 | 0.01600 |
| 67 | 0.03044 | 0.01743 |
| 68 | 0.03319 | 0.01884 |
| 69 | 0.03617 | 0.02036 |
| 70 | 0.03951 | 0.02211 |
| 71 | 0.04330 | 0.02423 |
| 72 | 0.04765 | 0.02687 |
| 73 | 0.05264 | 0.03011 |
| 74 | 0.05819 | 0.03393 |
| 75 | 0.06419 | 0.03824 |
| 76 | 0.07053 | 0.04297 |
| 77 | 0.07712 | 0.04804 |
| 78 | 0.08390 | 0.05345 |
| 79 | 0.09105 | 0.05935 |

TABLE 2-continued

Cost of Insurance Rates

| Age | Male | Female |
|---|---|---|
| 80 | 0.09884 | 0.06599 |
| 81 | 0.10748 | 0.07360 |
| 82 | 0.11725 | 0.08240 |
| 83 | 0.12826 | 0.09253 |
| 84 | 0.14025 | 0.10381 |
| 85 | 0.15295 | 0.11610 |
| 86 | 0.16609 | 0.12929 |
| 87 | 0.17955 | 0.14332 |
| 88 | 0.19327 | 0.15818 |
| 89 | 0.20729 | 0.17394 |
| 90 | 0.22177 | 0.19075 |
| 91 | 0.23698 | 0.20887 |
| 92 | 0.25345 | 0.22881 |
| 93 | 0.27211 | 0.25151 |
| 94 | 0.29590 | 0.27931 |
| 95 | 0.32996 | 0.31732 |
| 96 | 0.38455 | 0.37574 |
| 97 | 0.48020 | 0.47497 |
| 98 | 0.65798 | 0.65585 |
| 99 | 1.00000 | 1.00000 |

As noted above, a mortality fluctuation reserve ("reserve") can be established to stabilize the mortality experience under the policy. The maximum reserve can vary. According to one embodiment of the present invention, the maximum reserve is two times the cost of insurance for the policy year. The reserve can be funded through the cost of insurance deductions made from the policy during a policy year less the net amount at risk paid for death benefits during the year. The reserve may be held in the policy's separate accounts and credited with any earnings under the separate account(s). Amounts in excess of the maximum reserve can be released to cash value as an experience credit. Upon termination of the policy, any available reserve is paid to the policy owner.

As noted above, mortality experience credit may be payable if mortality is more favorable than anticipated, and the mortality fluctuation reserve exceeds the threshold amount that the company determines is necessary to stabilize mortality (e.g., two times cost of insurance for the year). A mortality risk charge may optionally be applied before any credit is determined. Experience credits, when applicable, are periodically determined and applied on policy anniversaries or at other predetermined periods of time. Unless otherwise elected, experience credits for the group may be applied to the insured's cash value in the same proportion that an insured's mortality fluctuation reserve bears to the total. The owner may elect to have the experience credits paid in cash.

A U.S. Federal Excise Tax may be is assessed against life insurance premiums paid to non-U.S. taxpaying insurance companies at the prevailing rate (presently of 1% of premium). The tax applies to a U.S. taxpayer paying the premiums. The policy may or may not make any provision to reimburse the policy owner for such expense.

The present invention is also directed to data processing methods and systems that provide accurate and time-efficient ways of initiating, structuring and managing the above-described insurance products and techniques. FIG. 1 is a schematic illustration of exemplary data processing methods, systems and devices 10 of the present invention.

A data processing method for initiating, structuring and managing an insurance product, according to the present invention may include providing a data processing device comprising one or more of an input device 20, an output device 40, and a processing unit 30 that comprises a memory 32 and a processor 34. The input device is illustrated as a keyboard, however, alternative input devices and techniques are possible, including voice recognition hardware and software, and electronic data transfer via a network connection. The memory 32 can comprise one or more conventional memory devices such as ROM, RAM and EEPROM devices. The memory 32 can contain data, software, executable instructions, scripts and other common memory elements or components. The processor 34 is in communication with the memory 32, and functions therewith in a typical manner to, for example, retrieve data, execute calculations and other instructions, and provide control and system functions.

According to the data processing method, information from a pool of insurance applicants is entered via the input device 20. Such information may include health-related information (e.g., age and weight), as well as identifying information (e.g., address, drivers license number, etc.). One or more insureds from the pool of inputted applicants may be selected by comparison of the inputted information from each applicant using predetermined criteria stored in the memory 32. For example, the processor 34 retrieves data from the memory 32 and compares that data using instructions and/or software executed by the processor 34.

The amount of at least one premium payment may be calculated using, at least in part, cost of insurance information stored in the memory 32. The output device 40 can generate at least one policy document 62. The output device 40 can comprise one or more of a visual and/or audible output device 50 (e.g., a monitor), and a printer 60. Other output devices are contemplated. For example, the output may be a conventional electronic transfer via a network connection. The policy document 62 preferably comprises cash value and death benefit information.

The data processing device and method preferably associates the at least one premium payment with an account, the account being invested to generate a rate of return. This association may be performed manually or the association may be automatically executed via software or other instructions executed by the processor 34. The method may further include inputting the rate of return into the memory 32, and calculating at least one cash value and death benefit value based, at least in part, on the rate of return. These operations may also be performed manually via the input device 20, or automatically, as described above.

The method can include calculating a mortality fluctuation reserve, and associating the reserve with the account. A mortality experience credit may also be calculated. The various features of the mortality reserve and mortality reserve credit have already been described in some detail above. These operations may be performed manually or automatically.

A data processing system is also comprehended by the present invention. The system preferably comprises a data processing device 10, the device comprising means for: inputting information from a pool of insurance applicants into the data processing device; selecting one or more insureds from the pool of inputted applicants by comparison of the inputted information from each applicants using predetermined criteria; calculating the amount of at least one premium payment using, at least in part, utilizing cost of insurance information; generating at least one policy document utilizing, at least in part, the output device, the policy document comprising a cash value and a death benefit; associating the at least one premium payment with an account, the account being invested to generate a rate of return; inputting the rate of return, and calculating at least one cash value and death benefit value based, at least in part, on the rate of return; calculating a mortality fluctuation reserve, and associating the reserve with the account; and calculating a mortality experience credit. The means that can be provided to carry out the above functions are preferably chosen from one or more of the input devices 20, central units 30, memory components 32, processors 34, output devices 40, visual and/or audible displays 50 and printers 60 having those features, components and functionality described above.

While this invention is satisfied by embodiments in many different forms, as described in detail in connection with preferred embodiments of the invention, it is understood that the present disclosure is to be considered as exemplary of the principles of the invention and is not intended to limit the invention to the specific embodiments illustrated and described herein. Numerous variations may be made by persons skilled in the art without departure from the spirit of the invention. The scope of the invention will be measured by the appended claims and their equivalents. The abstract and the title are not to be construed as limiting the scope of the present invention, as their purpose is to enable the appropriate authorities, as well as the general public, to quickly determine the general nature of the invention. In the claims that follow, unless the term "means" is used, none of the features or elements recited therein should be construed as means-plus-function limitations pursuant to 35 U.S.C. §112, ¶6

I claim:

1. A system for structuring a life insurance product, the system comprising:
    a memory for storing executable instructions; and
    a processor for performing the steps comprising:
    selecting one or more insureds from a pool of applicants;
    collecting at least one premium payment, the at least one premium payment comprising a charge for cost of insurance;
    issuing at least one policy covering the one or more insureds, the at least one policy having a cash value and a death benefit;
    placing the at least one premium payment into an account, thereby populating the account with assets;
    investing the assets thereby generating a rate of return;
    tying the cash value and death benefit amounts to the rate of return;
    creating and funding a mortality fluctuation reserve to stabilize the mortality experienced under the at least one policy, wherein the mortality fluctuation reserve is funded through cost of insurance deductions made from the at least one policy during a policy year less a net amount at risk paid for death benefits during the policy year to a maximum reserve amount;
    adding the mortality fluctuation reserve to the account, and investing the mortality fluctuation reserve; and
    periodically paying a mortality experience credit in the event that the actual mortality rate is more favorable than a predicted mortality rate, and to the extent that the mortality fluctuation reserve exceeds the maximum reserve amount, wherein the maximum reserve amount is correlated to the cost of insurance for the policy year, and wherein the cost of insurance is determined and deducted from cash value at an end of a policy year for the one or more insureds.

2. The system of claim 1, further comprising aggregating at least one thousand polices together.

3. The system of claim 1, wherein the death benefit comprises at least $250,000.

4. The system of claim 3, wherein the death benefit is payable upon death of the insured, prior to age one hundred.

5. The system of claim 1, wherein the cash value is payable upon termination of the policy or upon the insured reaching age one hundred.

6. The system of claim 1, wherein the premium is paid with a single payment.

7. The system of claim 1, further comprising the insured assigning their rights in the policy to a non-profit or charitable organization, a supporting organization of the non-profit or charitable organization, or an entity with insurable interest rights.

8. The system of claim 7, wherein the premium is paid by the non-profit or charitable organization, a supporting organization of the non-profit or charitable organization, or an entity with insurable interest rights.

9. The system of claim 7, wherein the non-profit or charitable organization, or agent thereof directs the allocation of the assets among a plurality of investments.

10. The system of claim 1, further comprising determining the premium based on the 1980 Commissioner's Standard Ordinary Male and Female Tables, the at least one insured's age, and 4 percent interest.

11. The system of claim 1, further comprising issuing an interest crediting rate on a periodic basis, wherein the crediting rate is equal to the anticipated gross investment return rate for the at least one account, less investment expense and a margin of profit.

12. The system of claim 1, further comprising deducting a percentage from the gross returns on the invested assets before applying the returns to the cash value.

13. The system of claim 12, wherein the deduction is made on a monthly basis.

14. The system of claim 1, further comprising deducting a mortality risk charge from the at least one account.

15. The system of claim 14, wherein the mortality risk charge decreases with increasing age of the policy.

16. The system of claim 15, wherein the mortality risk charge comprises 3% for years 1-10 of the policy, 1% for years 11-20, and 0% thereafter.

17. The system of claim 16, wherein the mortality risk charge is deducted annually, at the end of the year.

18. The system of claim 1, further comprising assessing a one-time charge to the cash value upon initiation of the policy.

19. The system of claim 18, wherein the one-time charge decreases with an increasing number of insureds.

20. The system of claim 19, further comprising deducting a fee from the cash value of the policy at the beginning of each policy year for the first twenty years of the policy.

21. The system of claim 1, further comprising calculating a cost of insurance charge and deducting said charge from the cash value of the at least one policy on an annual basis, at the end of the year.

22. The system of claim 1, wherein the death benefit is payable only at the end of the calendar policy year.

23. The system of claim 1, further comprising adjusting the face value of the policy in order to maintain qualification of the at least one policy as a modified endowment contract.

24. The system of claim 1, wherein the mortality experience credit is paid annually.

25. The system of claim 1, wherein the maximum reserve amount is approximately two-times the cost of insurance.

26. The system of claim 1, further comprising the one or more insureds granting consent to a nonprofit or charitable organization, a supporting organization of a non-profit or charitable organization, or an entity with insurable interest rights, to have the policy issued to cover their lives, and assigning all rights in the policy to the organization or entity.

27. A data processing method for initiating, structuring and managing an insurance product, the method comprising:
   providing a data processing device comprising an input device, an output device, a processor and a memory;
   inputting information from a pool of insurance applicants into the data processing device via the input device;
   selecting, by a processor, one or more insureds from the pool of inputted applicants by comparison of the inputted information from each applicant stored in the memory using predetermined criteria;
   calculating, by a processor, the amount of at least one premium payment using, at least in part, cost of insurance information stored in the memory;
   generating at least one policy document utilizing, at least in part, the output device, the policy document comprising cash value and a death benefit information;
   associating, by a processor, the at least one premium payment with an account, the account being invested to generate a rate of return;
   inputting, by a processor, the rate of return into the memory, and calculating, by a processor, at least one cash value and death benefit value based, at least in part, on the rate of return;
   calculating, by a processor, a mortality fluctuation reserve to stabilize the mortality experienced under the at least one policy, wherein the mortality fluctuation reserve is funded through cost of insurance deductions made from the at least one policy during a policy year less a net amount at risk paid for death benefits during the policy year to a maximum reserve amount, and associating, by a processor, the reserve with the account; and
   periodically calculating, by a processor, a mortality experience credit in the event that the actual mortality rate is more favorable than a predicted mortality rate, and to the extent that the mortality fluctuation reserve exceeds the maximum reserve amount, wherein the maximum reserve amount is correlated to the cost of insurance for the policy year, and wherein the cost of insurance is determined and deducted from cash value at an end of a policy year for the one or more insureds.

28. The method of claim 27, further comprising aggregating at least one thousand polices together.

29. The method of claim 27, wherein the calculated death benefit comprises at least $250,000.

30. The method of claim 27, wherein the premium payment is calculated as a single payment.

31. The method of claim 27, further comprising the insured assigning their rights in the policy to a non-profit or charitable organization, a supporting organization of the non-profit or charitable organization, or an entity with insurable interest rights.

32. The method of claim 31, wherein the premium is paid by the non-profit or charitable organization, a supporting organization of the non-profit or charitable organization, or an entity with insurable interest rights.

33. The method of claim 31, wherein the non-profit or charitable organization, or agent thereof directs the allocation of the assets among a plurality of investments.

34. The method of claim 27, further comprising calculating the premium based on information contained in the memory comprising, at least in part, the 1980 Commissioner's Standard Ordinary Male and Female Tables, the at least one insured's age, and 4 percent interest.

35. The method of claim 27, further comprising calculating an interest crediting rate on a periodic basis, wherein the crediting rate is equal to the anticipated gross investment return rate for the at least one account, less investment expense and a margin of profit.

36. The method of claim 27, further comprising a calculation comprising deducting a percentage from the gross returns on the invested assets before applying the returns to the cash value.

37. The method of claim 36, wherein the deduction is made on a monthly basis.

38. The method of claim 27, further comprising a calculation comprising deducting a mortality risk charge from the at least one account.

39. The method of claim 38, wherein the mortality risk charge decreases with increasing age of the policy.

40. The method of claim 39, wherein the mortality risk charge comprises 3% for years 1-10 of the policy, 1% for years 11-20, and 0% thereafter.

41. The method of claim 38, wherein the mortality risk charge is deducted annually, at the end of the year.

42. The method of claim 27, further comprising a calculation comprising deducting a one-time charge to the cash value upon initiation of the policy.

43. The method of claim 42, wherein the one-time charge decreases with an increasing number of insureds.

44. The method of claim 43, further comprising a calculation comprising deducting a fee from the cash value of the policy at the beginning of each policy year for the first twenty years of the policy.

45. The method of claim 27, further comprising calculating a cost of insurance charge and deducting said charge from the cash value of the at least one policy on an annual basis, at the end of the year.

46. The method of claim 27, wherein the death benefit is payable only at the end of the calendar policy year.

47. The method of claim 27, further comprising recalculating the face value of the policy in order to maintain qualification of the at least one policy as a modified endowment contract.

48. The method of claim 27, wherein the mortality experience credit is calculated annually.

49. The method of claim 27, wherein the maximum reserve amount is approximately two-times the cost of insurance.

50. The method of claim 27, further comprising the one or more insureds granting consent to a nonprofit or charitable organization, a supporting organization of a non-profit or charitable organization, or an entity with insurable interest rights, to have the policy issued to cover their lives, and assigning all rights in the policy to the organization or entity.

51. A data processing system comprising a data processing device, the device comprising means for:
   inputting information from a pool of insurance applicants into the data processing device;
   selecting one or more insureds from the pool of inputted applicants by comparison of the inputted information from each applicants using predetermined criteria;
   calculating the amount of at least one premium payment using, at least in part, cost of insurance information;
   generating at least one policy document utilizing, at least in part, the output device, the policy document comprising cash value and death benefit information;
   associating the at least one premium payment with an account, the account being invested to generate a rate of return;
   inputting the rate of return, and calculating at least one cash value and death benefit value based, at least in part, on the rate of return;
   calculating a mortality fluctuation reserve to stabilize the mortality experienced under the at least one policy, wherein the mortality fluctuation reserve is funded through cost of insurance deductions made from the at least one policy during a policy year less a net amount at risk paid for death benefits during the policy year to a maximum reserve amount;

periodically calculating a mortality experience credit in the event that the actual mortality rate is more favorable than a predicted mortality rate, and to the extent that the mortality fluctuation reserve exceeds the maximum reserve amount, wherein the maximum reserve amount is correlated to the cost of insurance for the policy year, and wherein the cost of insurance is determined and deducted from cash value at an end of a policy year for the one or more insureds.

* * * * *